United States Patent [19]
Grafström et al.

[11] Patent Number: 4,609,055
[45] Date of Patent: Sep. 2, 1986

[54] VIBRATING PLATE

[75] Inventors: Lars M. Grafström, Trelleborg; Lennart Hallstedt, Lyckeby; Per Enochsson, Karlskrona, all of Sweden

[73] Assignee: Dynapac Maskin AB, Solna, Sweden

[21] Appl. No.: 681,991

[22] PCT Filed: May 30, 1984

[86] PCT No.: PCT/SE84/00205
§ 371 Date: Nov. 15, 1984
§ 102(e) Date: Nov. 15, 1984

[87] PCT Pub. No.: WO84/04791
PCT Pub. Date: Dec. 6, 1984

[30] Foreign Application Priority Data

Jun. 1, 1983 [SE] Sweden ............................ 8303080
Nov. 22, 1983 [SE] Sweden ............................ 8306439
Nov. 22, 1983 [SE] Sweden ............................ 8306440

[51] Int. Cl.⁴ .................... F16F 15/08; E02D 3/046
[52] U.S. Cl. .................... 173/162 H; 16/111 R; 16/116 R; 267/75
[58] Field of Search .................. 173/162 R, 162 H; 16/110 R, 111 R, 112, 115, 116 R, 116 A, DIG. 5, DIG. 12, DIG. 41; 74/551.2; 404/33, 113; 267/75, 182

[56] References Cited
U.S. PATENT DOCUMENTS

| 2,831,463 | 4/1958 | Ekstrom | 173/162 H |
| 3,232,188 | 2/1966 | Frohnauer | 404/113 |
| 4,401,167 | 8/1983 | Sekizawa et al. | 173/162 H |
| 4,420,989 | 12/1983 | Finkle | 74/551.2 |

Primary Examiner—James M. Meister
Assistant Examiner—John L. Knoble
Attorney, Agent, or Firm—Schiller & Pandiscio

[57] ABSTRACT

A system is disclosed for minimizing the transmission of vibrations from a vibratory source through a pair of shafts to a handle mounted transversely to the shafts. The handle is mounted to the shafts through resilient, elastomeric, hourglass-shaped shock absorbers. The mass of the handle and the spring stiffness of the shock absorbers are selected to provide the handle with a characteristic frequency ($F_c$) such that $F_s > \sqrt{2}\, F_c$. To limit axial deflection of the shock absorbers when transverse forces are applied to the handle, each of the elastomeric elements is mounted between and inside a respective pair of nested cups having their open ends facing one another, one cup of each pair being connected to the handle and the other cup of each pair being connected to a shaft.

7 Claims, 5 Drawing Figures

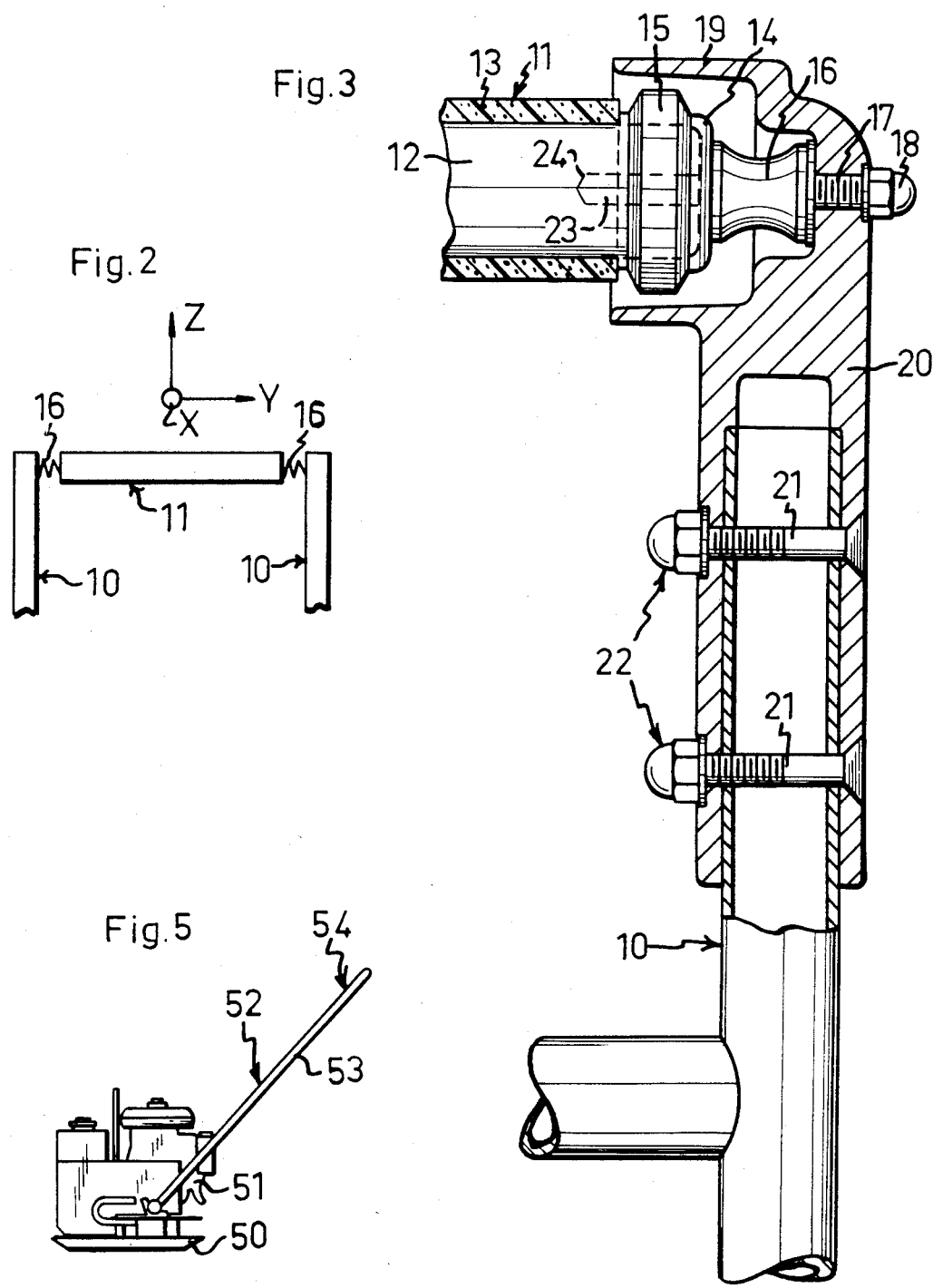

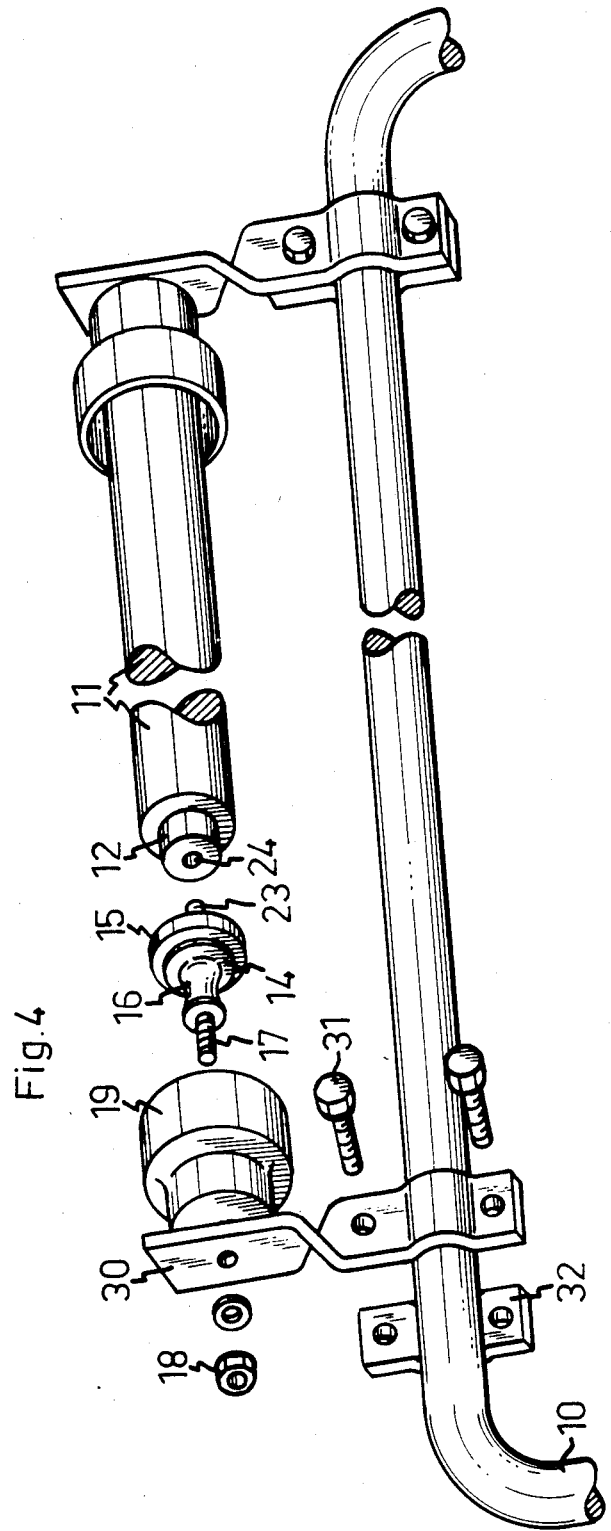

VIBRATING PLATE

This invention relates to a so-called vibrating plate, that is a device which comprises a compactor plate with engine and vibration generator, said compactor plate being adapted for application to the ground. Such vibrating plates can be used for compaction of sand and gravel as well as asphalt coatings. Such vibrating plates have a handle by which the vibrating plate is operated. A difficult problem associated with this type of tool resides in the transmission of vibrations from the vibrating plate to the operator. Therefore, one has tried in different ways to dampen the transmission of vibrations. Such a prior art device for damping the transmission of vibrations is described in No. EP-A-0,081,079 and the corresponding published Swedish patent application Nos. SE-A-8107365-2 and 8203697-1. This publication describes a handle arrangement in which biased elastomer springs are utilized between the operating member and the shaft member.

Another prior art device for damping vibrations between a vibrating tool and a handle is described and shown in U.S. Pat. No. 4,282,938, where the damping of the vibrations is absorbed with the aid of leaf spring elements and a magnetic damper.

The first of these prior art devices have proved to be unsatisfactory for damping vibrations from a vibrating plate even though this device is useful for light-weight equipment. The last-mentioned prior art device is disadvantageous in that it is expensive and requires much material.

This invention aims at providing a vibrating plate in which the operating and shaft members of the handle are interconnected by at least one spring element the stiffness of which has been adapted to the mass of the operating member such that an excellent vibration insulation is obtained. The invention also aims at providing a vibrating plate the operating member of which is highly insulated from the remaining vibrating plate by means of a simple but effective vibration insulation device.

According to the invention, a vibrating plate of the type outlined in the foregoing shall be characterised in that the mass of the operating member and the spring stiffness of the spring element or elements are so adapted to one another and to the vibrating frequency of the vibrating plate that the relationship between the frequency of the vibration generator and the characteristic frequency of the operating member with regard to translational and rotational movements respectively along and about the axis of the operating member and respectively along and about two directions at right angles to said axis and also to one another, is $> \sqrt{2}$. Thus the invention is based on the observation that one has to adapt the spring stiffness and the mass of the operating member in such a way to one another that the characteristic frequencies of the operating member (with regard to said directions) lie substantially below the interfering frequency, i.e. the interfering frequency generated by the vibrating plate. Only in this way is it thus possible to safeguard a high-grade vibration insulation and prevent an amplification of the transmission of vibrations as a result of natural oscillation conditions in the operating member.

According to the invention, it is of special advantage if the operating member is connected at both of its ends to the shaft member of the handle and if each of the spring elements is in the form of an elastomer body which is of approximately hour-glass shape and which is axially arranged in relation to the operating member.

To prevent that the elastomer body bursts under torsion it is of particular advantage to connect the elastomer body rotatably to the operating member or the shaft member.

In a further development of the invention the spring deflection restricting mechanical device is formed by a cup-shaped means which is connected to the shaft member of the handle and has a larger inner diameter than the outer diameter of the part of the operating member projecting into said cup-shaped means. It is particularly advantageous if the part projecting into the cup-shaped means is provided with a preferably annular, shock-absorbing and shock-damping elastomer element adapted to engage said cup-shaped means.

To further insulate the operator from the vibrations of the vibrating plate the operating member preferably has a jacket of resilient elastomer material.

The invention will now be described more in detail with reference to the accompanying drawings in which:

FIG. 2 shows a basic sketch for calculation of spring stiffness and mass of the handle device for the vibrating plate;

FIG. 3 shows parts of another example of a handle for the vibrating plate according to the present invention;

FIG. 4 shows a further example of a vibrating plate with a separately mounted operating member; and FIG. 5 shows a diagrammatic side view of a vibrating plate according to the present invention.

Figure 1:
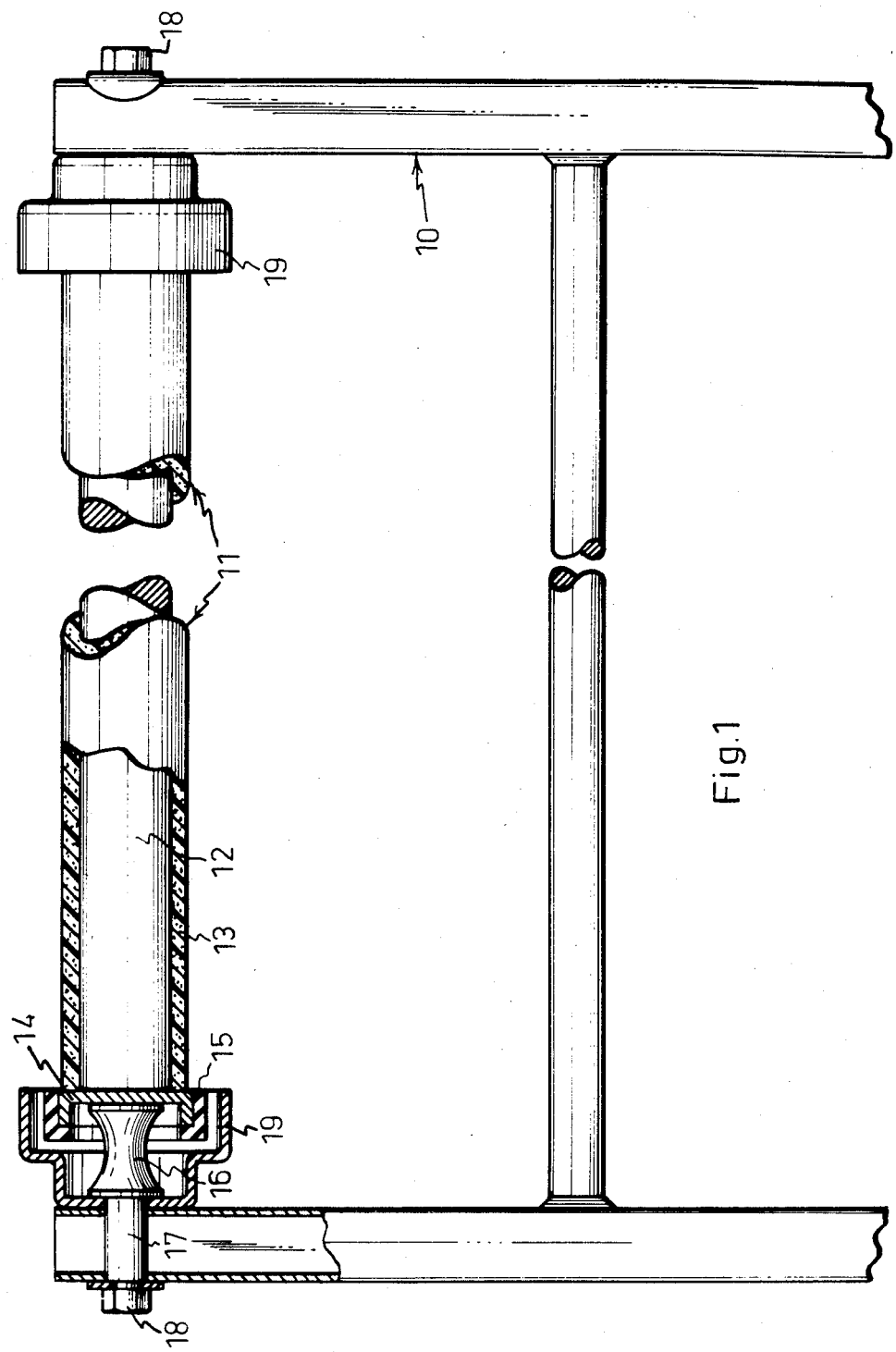
FIG. 1 shows an example of a handle for a vibrating plate according to the present invention.

The vibrating plate according to the present invention is diagrammatically shown in FIG. 5 and comprises a compactor plate 50 which is adapted for application to the ground and which supports an engine 51 with a vibrating device (not shown in detail). Besides the vibrating plate has a handle 52 which comprises a shaft member 53 and an operating member 54.

FIG. 1 shows an example how the handle for the vibrating plate according to the invention may be designed. The handle thus has a shaft member 10 which corresponds to the shaft member 53 in FIG. 5. An operating member 11 is connected to said shaft member. The operating member 11 has a core 12 of metal or plastics, preferably a steel rod, about which a jacket 13 of a suitable resilient material, preferably elastomer material, is fastened. The elastomer material most preferably is porous with closed pores. At each end the operating member 11 has a cup-shaped means 14 the open side of which is facing outwardly. A ring 15 of rubber or plastics is fixed about the periphery of the cup-shaped means 14, for instance by vulcanization. A rubber spring 16 of hour-glass shape (i.e., a body of revolution about an axis, the body having an axial section substantially similar to an axial section of an hourglass or a hyperboloid of one sheet) is fixed centrally in the cup-shaped means 14, for instance with the aid of a metal plate which is vulcanized to the elastomer spring and faces the operating member 11. A metal plate is also vulcanized to the other end of the elastomer spring 16, said metal plate being connected to or integral with a bolt 17. A second cup-shaped means 19 is arranged on the bolt 17 and the open side of said means faces the operating member 11. The cup-shaped means 19 has a larger diameter than the cup-shaped means 14 and the rubber ring 15 fixed thereto, and extends inwardly over said ring. The operating member 11 is fixed between the upstanding shaft members 10 of the handle by means of the bolts 17 passed through transverse bores at the outer ends of the shaft member and anchored to the shaft members by means of nuts. At the mounting, the cup-shaped means 19 are passed over the bolts 17 and clamped between the corresponding elastomer spring and the adjacent shaft member 10.

FIG. 3 shows a further example how the handle of the vibrating plate may be designed. In this instance, the handle comprises an angle piece 20 one end of which is passed over the shaft member 10 of the handle and anchored thereto by means of two fastening screws 21 with cap nuts 22. The outer end of the angle piece is integral with the cup-shaped means 19 into which the operating member 11 of the handle projects. This embodiment of the handle and its operating member 11 differs from the embodiment shown in FIG. 1 also with regard to the connection of the elastomer spring 16 with the operating member 11 and the angle piece 20. In this instance, too, the elastomer spring 16 is in the shape of an hour-glass or dumbbell and has metal plates vulcanized to its end surfaces. The right-hand metal plate shown in the drawing is connected to the fastening bolt 17 which penetrates through a hole of the angle piece 20 and is clamped thereto by means of the nut 18. The metal plate vulcanized to the other end of the elastomer spring 16 is integral or united with a cylindrical pin 23 which projects into a cylindrical bore 24 in the end surface of the core 12 of the operating member. The core 12 with its jacket 13 is thus rotatable in relation to the elastomer spring 16. The embodiment according to FIG. 3 differs from that of FIG. 1 also with regard to the cup-shaped means 14 which in this case is facing in the opposite direction and thus grasps the core 12 and is connected thereto. Same as earlier, an annular rubber body 15 is fastened to the outer side of the cup-shaped means 14 in order to serve as a spring deflection restricting device together with the cup-shaped means 19 on the angle piece 20.

In FIG. 4 there is shown a further example how the vibrating plate according to the invention may be provided with a handle for vibration insulation. In FIG. 4 use has been made of the same reference numerals as earlier for the various components. The difference in this case is that the handle is mounted with the aid of special brackets 30 which are mounted on the handle 10 of the vibrating plate by means of bolts 31 and a clasp 32. Another difference resides in that the cup-shaped means 14 in this case is vulcanized in one piece with the elastomer spring 16 and provided with the elastomer ring 15 on its outer side.

As mentioned above, one shall in accordance with the present invention adapt the mass of the operating member and the spring stiffness of the spring element or elements in a certain way to each other and to the frequency of the vibrating plate, i.e. the interfering frequency. This adaptation shall take place such that the relationship between the interfering frequency and the characteristic frequency of the operating member with regard to translational and rotational movements respectively along and about the axis of the operating member and respectively along and about two directions at right angles to said axis and also to each other, is $>\sqrt{2}$. The theoretical calculation of the correct spring stiffness and mass for the vibration insulating handle of the vibrating plate shall be described hereinbelow with reference to FIG. 2 which diagrammatically shows the shaft members 10 of the handle and the operating member 11 mounted therebetween with the aid of the springs 16. In FIG. 2, there are shown three coordinates at right angles to each other, namely the Y-direction which is axial with the operating member 11, and the two directions Z and X which are at right angles to each other and to the Y-direction. In the drawing, the axis X is at right angles to the paper and extends through the point of intersection of the two arrows Y and Z.

The suspension of the operating member 11 is such that for the calculation of the vibration insulation one has to consider six different vibration directions to permit establishing the exact position of the operating member in each particular case. Three of these movements are translation movements, namely in the direction of the axes X, Y and Z. Besides one has to consider rotational movements about each of these axes. In this connection, $\alpha$ designates rotation about the X-axis, $\beta$ rotation about the Y-axis and $\gamma$ rotation about the Z-axis. For each of these translational and rotational movements there is a characteristic frequency which is important in conjunction with the present invention. To obtain a fully satisfactory insulation of the operating member 11 relative to the shaft portions 10 it has been found, according to the invention, that these characteristic frequencies must lie considerably lower than the interfering frequency (the main frequency of the vibration generated by the vibrating plate), the best insulation being obtained if the relationship between the interfering frequency and the respective characteristic frequency is $>\sqrt{2}$.

As the suspension of the operating member is a so-called three-symmetry suspension the calculation of the characteristic frequencies can be simplified considerably. The characteristic frequencies are therefore calculated in the following manner:

TRANSLATIONAL MOTION

Z-direction $\quad f_Z = \frac{1}{2\pi} \sqrt{\frac{2 k_Z}{M}}$

Y-direction $\quad f_y = \frac{1}{2\pi} \sqrt{\frac{2 k_y}{M}}$ x-direction $\quad f_x = \frac{1}{2\pi} \sqrt{\frac{2 k_x}{M}}$

ROTATIONAL MOTION about Z-axis $\quad f_\gamma = \frac{1}{2\pi} \sqrt{\frac{2 k_x \cdot a_y^2}{M \cdot \rho_z^2}}$ about x-axis $\quad f_\alpha = \frac{1}{2\pi} \sqrt{\frac{2 k_x \cdot a_y^2}{M \cdot \rho_x^2}}$ about Y-axis $\quad f_\beta = \frac{1}{2\pi} \sqrt{\frac{2 \cdot k_\beta}{M \cdot \rho_y^2}}$ In these formulae:

$f_Z$ is the characteristic frequency of the translational motion in the Z-direction (Hz)

$f_y$ is the characteristic frequency of the translational motion in the Y-direction (Hz)

$f_X$ is the characteristic frequency of the translational motion in the X-direction (Hz)

$f_\gamma$ is the characteristic frequency of the rotational motion about the Z-axis (Hz)

$f_\beta$ is the characteristic frequency of the rotational motion about the Z-axis (Hz)

$f_\alpha$ is the characteristic frequency of the rotational motion about the X-axis (Hz) (in this instance, $f_\alpha=0$, which is due to the spring being theoretically fastened in the mass without or with low friction)

M is the mass of the operating member in kg $k_Z$ is the stiffness of the spring element in the Z-direction in N/m $k_y$ is the stiffness of the spring element in the Y-direction N/m $k_x$ is the stiffness of the spring element in the X-direction in N/m $k_\beta$ is the torsion stiffness of the spring element about the Y-axis in Nm/radian $a_y$ is the center-of-mass distance to the line of symmetry of the spring, meter measured along the Y-axis $\rho_Z$ is the radius of gyration of the operating member with respect to the Z-symmetry axis, meter $\rho_X$ is the radius of gyration of the operation member with respect to the X-symmetry axis, meter If the spring constants of the two springs 16 are adapted in such a way that each of the characteristic frequencies indicated above is so much less than the vibrating plate interfering frequency caused by the vibration that the relationship between said frequency and the respective characteristic frequency of the operating portion is $>\sqrt{2}$, one will obtain a very good vibration insulation. By reason of the design of the spring elements in the shape of hour-glasses or dumbbells and by the absence of a bias of the spring elements, a very long life will be obtained for the spring elements and the fastening of the operating member in the shaft members. With the use of the vibrating plate the operating member will thus be very satisfactorily vibration insulated in relation to the rest of the vibrating plate, which makes it more convenient for the operator to handle the machine and will also reduce the risk of occupational injuries. When the machine is turned or otherwise handled and the operator exerts a considerable force on the member 11, the rubber ring 15 fastened to the cup-shaped means 14 will engage the inner side of the cup-shaped means 19 such that an exact operation of the machine is not prevented by the spring arrangement. This spring deflection restricting device also permits lifting of the vibrating plate by the handle without any risk that the spring elements 16 will be damaged.

We claim:

1. In a vibratory machine including a vibration source, an elongated handle and an elongated shaft means for mechanically coupling said source and said handle to one another, the improvement comprising:
   at least one resilient means formed as an hourglass-shaped body of revolution about an axis, and disposed coaxially with respect to said handle for coupling the latter transversely to the axis of said shaft means;
   means for limiting axial deflection of said resilient means due to application of forces in any direction transversely across said handle;
   said resilient means having a spring stiffness and said handle having a mass, both selected so that the relationship between the frequency ($F_s$) of said source and the characteristic frequencies ($F_c$) of said handle with respect to translational and rotational motions along and about the axis of said handle, and respectively along and about two other directions both normal to said axis and to one another is such that $F_s > \sqrt{2} F_c$.

2. In a vibratory machine as set forth in claim 1, wherein said means for limiting said axial deflection comprises:
   first cup shaped means connected adjacent one end of said handle with the open end of said first cup-shaped means extending axially outwardly from said handle and supporting one end of one of said resilient means;
   second cup shaped means connected to said shaft means with the open end thereof extending axially inwardly toward said handle and supporting the other end of said resilient means, the inside diameter of one of said cup-shaped means being greater than the outside diameter of the other of said cup-shaped means.

3. In a vibratory machine as set forth in claim 2, wherein said second cup-shaped means has an inside diameter greater than the outside diameter of said first cup-shaped means.

4. In a vibratory machine as set forth in claim 2, wherein said resilient means is rotatably connected to either said handle or said shaft means.

5. In a vibratory machine as set forth in claim 2, including a ring of shock-absorbing and shock-damping elastomeric material disposed between the outer and inner peripheries respectively of said cup-shaped means having said inside and outsider diameters.

6. In a vibratory machine as set forth in claim 1 wherein said shaft means includes two shafts, said machine including a pair of said resilient means, each of which is coupled between a respective one of said shafts and respective opposite ends of said handle.

7. In a vibratory machine as set forth in any of the preceding claims, including a jacket of resilient elastomeric material disposed about said handle.

* * * * *